United States Patent [19]

Lemke et al.

[11] Patent Number: 5,609,095
[45] Date of Patent: Mar. 11, 1997

[54] HIGH PERFORMANCE COOKING OVEN WITH STEAM CHAMBER

[75] Inventors: Ronald D. Lemke, Huron; Ramesh M. Gunawardena, Solon; James G. Weit, Milan, all of Ohio

[73] Assignee: Stein, Inc., Sandusky, Ohio

[21] Appl. No.: 86,669

[22] Filed: Jul. 1, 1993

[51] Int. Cl.⁶ ............................... A23L 3/00; A47J 27/16
[52] U.S. Cl. .................... 99/468; 99/477; 99/482
[58] Field of Search ................. 99/331, 477, 443 C, 99/468, 479, 482; 219/388, 401; 126/21 A; 426/510, 511, 231, 232

[56] References Cited

U.S. PATENT DOCUMENTS

| | | | |
|---|---|---|---|
| 2,985,210 | 5/1961 | Magnuson | 99/443 C |
| 4,271,685 | 6/1981 | Williams | 62/374 |
| 4,363,263 | 12/1982 | Williams | 99/352 |
| 4,473,004 | 9/1984 | Wells | 99/443 C |
| 4,556,572 | 12/1985 | Kaufman, Jr. | 426/511 |
| 4,582,047 | 4/1986 | Williams | 126/369 |
| 4,737,373 | 4/1988 | Forney | 426/510 |
| 4,862,794 | 9/1989 | Lapeyre et al. | 99/443 |
| 4,940,040 | 7/1990 | Randall et al. | 126/21 A |
| 4,966,072 | 10/1990 | Ellis-Brown | 99/443 C |
| 5,072,663 | 12/1991 | Ellis-Brown | 99/468 |
| 5,075,120 | 12/1991 | Leary | 426/510 |
| 5,078,120 | 1/1992 | Hwang | 126/21 A |
| 5,184,538 | 2/1993 | Ledet | 99/468 |
| 5,189,948 | 3/1993 | Liebermann | 99/443 C |
| 5,329,916 | 7/1994 | Lygum | 99/479 |

Primary Examiner—David Scherbel
Assistant Examiner—Randall E. Chin
Attorney, Agent, or Firm—Oldham & Oldham Co., LPA

[57] ABSTRACT

The method and apparatus of the invention describes an oven having a housing formed by an enclosure, the enclosure having a cooking chamber in a portion thereof. The oven housing may also include an inlet and outlet positioned in predetermined relationship to the cooking chamber and a conveyor belt on which food products to be cooked are positioned. The conveyor belt travels through the oven housing from the inlet to the outlet and defines over a separate portion thereof a conveyance path through the cooking chamber. The oven further includes at least a source of steam for creating a cooking atmosphere in the cooking chamber. The cooking chamber of the oven is defined at its lower limit by the level of steam within the housing and the inlet and outlet are positioned below this lower limit to maintain the steam within the cooking chamber. In this manner, the escape of steam from the cooking chamber is substantially prevented or controlled. There may also be provided a temperature or steam sensing or measuring system, which can be used to maintain the desired steam atmosphere within the cooking chamber. Such an arrangement allows precise control of the flow rate of steam into the cooking chamber to thereby control the level of the steam cloud within the oven using a minimum amount of steam. Maintaining the desired steam level includes maintaining the steam density constant within the cooking chamber regardless of product flow into the oven. The oven may also include a steam recovery or containment system to minimize any loss of steam from the oven.

6 Claims, 4 Drawing Sheets

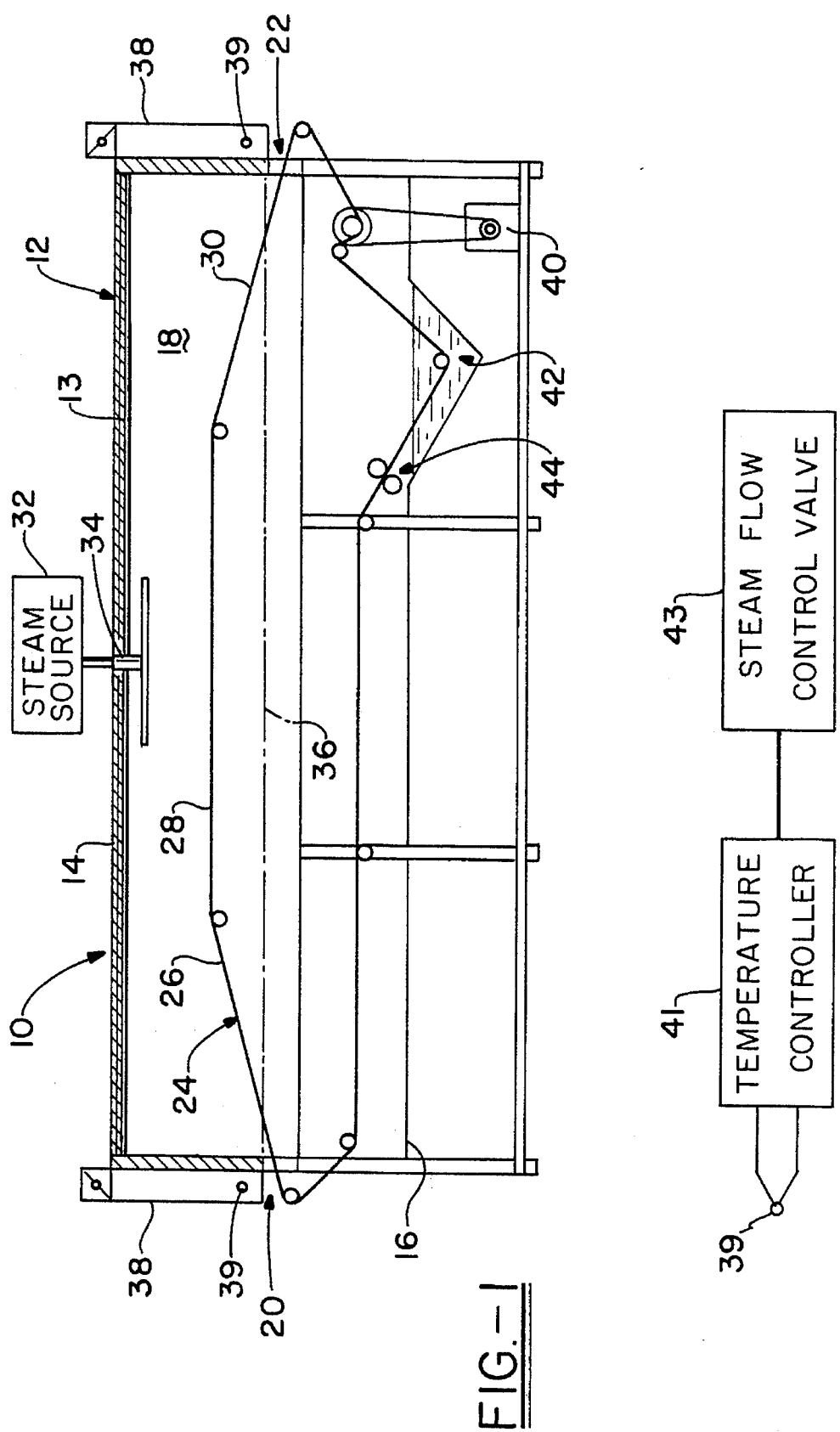

HIGH PERFORMANCE COOKING OVEN WITH STEAM CHAMBER

TECHNICAL FIELD

This invention relates to a cooking oven and associated method of cooking for large scale food processing. More particularly, the invention is directed to a cooking oven and method for cooking wherein the oven includes a steam chamber acting as a containment chamber for maintaining a very high moisture level in the cooking atmosphere of the oven using a minimum amount of steam.

BACKGROUND OF THE INVENTION

In large scale food processing systems, a desired attribute of an oven is to provide desired cooking characteristics of particular food products as quickly as possible to obtain high throughput from the oven. In such ovens, a continuously running conveyor is conventionally used to introduce food products to the oven on a continuous basis, with the conveyor running from an entrance or inlet opening to an exit or outlet opening associated with the oven. Such systems have included use of both linear and spiral or helical conveyors. These ovens accommodate a large amount of food products therein, and provide the predetermined dwell time to allow thorough and complete cooking of any particular type of food product desired.

The cooking atmosphere of such ovens has been conventionally provided by means of burner units which introduced a heated gas cooking medium by means of a flame source, or alternatively by the introduction of steam into the oven chamber. For many applications, the moisture level in an oven is maintained by the injection of steam into the cooking atmosphere. In an oven atmosphere containing high steam content, significant heat losses are normally found at the entrance and exit locations of a continuous conveyor belt associated with the oven. Although attempts have been made to produce steam ovens having a cooking atmosphere with high humidity, such attempts have not resulted in an oven which optimizes efficient use of steam injected into the oven to transfer heat to food products introduced into the oven. In known oven configurations, attempts have been made to create a steam atmosphere near 212° F. and 100% humidity at one atmosphere, with such an atmosphere created by introducing large amounts of steam into the oven to produce an oven atmosphere at a pressure which is above atmospheric. Such ovens have included exhaust ducts at the location of the inlet and outlet areas of a conveyor belt associated with the oven, which exhausts escaping gases from the oven. Although attempts have been made to reduce losses of steam and heat energy from such an oven, such attempts have not resulted in systems which substantially reduce flow rates of steam from the oven to increase efficiency of performance and maintain introduced steam in the cooking atmosphere.

SUMMARY OF THE INVENTION

Based upon the foregoing, it is a main aspect of the present invention to provide a cooking oven including steam containment means for maintaining a substantially saturated steam processing environment within the cooking chamber of the oven, under atmospheric conditions. The invention affords improved process time and product yield, or less weight loss in the cooked product resulting in increased throughput from the oven.

The apparatus and method of the invention desirably maintain the highest possible moisture level within the cooking chamber of the oven with the minimum amount of steam. To accomplish this, the oven of the invention comprises an oven housing formed by an enclosure, the enclosure having a cooking chamber in a portion thereof. The oven housing may also include an inlet and outlet positioned in another portion of the housing in relative spaced relationship to the cooking chamber defined therein. A continuous conveyor belt on which food products to be cooked are positioned travels through the oven housing from the inlet to the outlet and defines over a separate portion thereof a conveyance path through the cooking chamber. The oven further includes means to provide a heated gaseous cooking medium in the portion of the housing corresponding to the cooking chamber, such means including a source of steam. The cooking chamber of the oven is defined at its lower limit by the level of steam within the housing and the inlet and outlet are positioned below this lower limit to maintain the steam within the cooking chamber. In this manner, the escape of steam from the cooking chamber is substantially prevented as well as preventing the entry of air into the oven. There may also be positioned adjacent the product inlet and/or outlet a temperature or steam sensing means, which can be used to maintain the desired steam atmosphere within the cooking chamber. Such a sensing means allows precise control of the flow rate of steam into the cooking chamber to thereby control the level of the steam cloud within the oven using a minimum amount of steam. Maintaining the desired steam level includes maintaining the steam density constant within the cooking chamber regardless of product flow into the oven.

In an alternative embodiment, the cooking chamber will include a heated gaseous cooking medium having a predetermined amount of steam therein with means for the recovery of steam escaping from the inlet or outlet openings, being positioned adjacent and outside these openings in the oven housing. Steam escaping from the cooking chamber will be captured and recycled into the cooking chamber to substantially maintain the predetermined amount of steam within the cooking chamber. In this manner, the input of steam into this system is greatly reduced, thereby increasing cost effectiveness of the cooking operation and providing a saturated steam cooking atmosphere to allow cooking of food products in a shorter time and with less weight loss from the food product.

BRIEF DESCRIPTION OF THE DRAWINGS

The above and other aspects and advantages of the invention will become apparent upon a reading of the detailed description of the preferred embodiments in conjunction with the drawings wherein:

FIG. 1 is a schematic side elevational view of a cooking oven in accordance with the invention, using a linear conveyor therein;

FIG. 1A shows schematically a control means to regulate the flow of steam out of an opening in the oven housing;

DETAILED DESCRIPTION OF PREFERRED EMBODIMENTS

Figure 3:
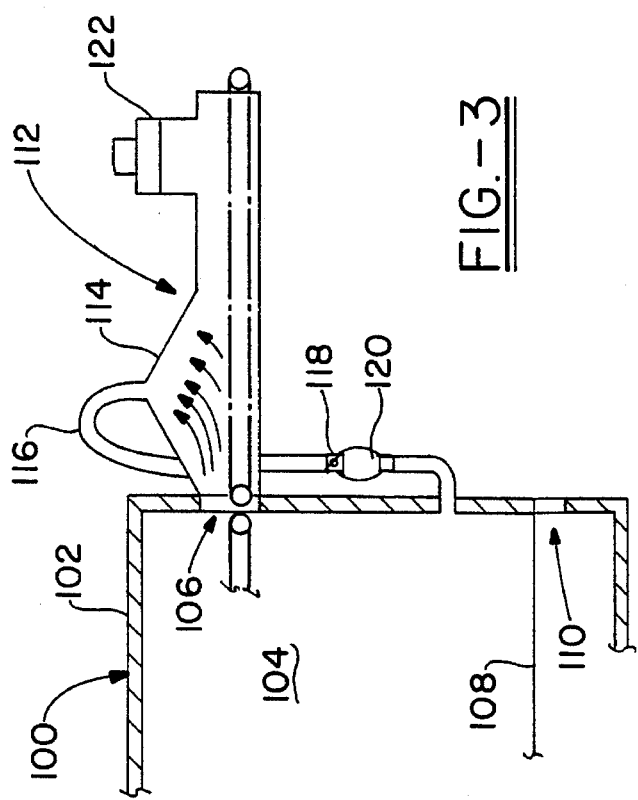
FIG. 3 shows a partial side elevational view of an oven housing defining a cooking chamber therein in accordance with the invention, including steam recovery means associated with an inlet or outlet of the oven.

Turning now to FIG. 1, a first embodiment of the invention is shown in schematic form, for a linear-type cooking oven. The cooking oven 10 comprises an oven housing defined by an enclosure 12 having a hood 14 and the base 16. The hood 14 may include means to lift the hood away from the base 16 for cleaning of the interior of the oven 10 as desired. The hood member 14 is sealed with respect to base 16 to eliminate any loss of heat from the oven at the junction therebetween. This seal may be provided by a water jacket 17 positioned about the exterior walls of the base 16 and an extending flange 19 from hood member 14 which will extend into the water jacket 17 and create a water seal. The walls of the oven enclosure 12 are preferably double walls having an interior insulation 13 in the space therebetween. There will also be provided at least one inlet 20 and at least one outlet 22 through which food products are introduced and exit a cooking chamber 18 for the cooking of the food products. Food products may be introduced onto a conveyor belt 24, which may be an endless belt having an upper conveyor run having a large portion thereof traveling through the cooking chamber 18, and a return or lower belt run traveling through base 16 of the oven.

The inlet 20 and outlet 22 of the oven are preferably made as small as feasible to retard the egress of any heated gaseous cooking medium from the cooking chamber 18. The top of the uppermost of the openings 20 and 22 essentially defines the lower limit of the cooking chamber 18, as above these openings there is no possibility for escape of a heated gaseous cooking medium within the cooking chamber 18. The openings are therefore positioned below the lower limit of said cooking chamber. In the preferred embodiment, the upper run of the conveyor belt 24 will have a first segment or portion 26 extending from the inlet opening 20 upwardly into the cooking atmosphere of cooking chamber 18. A segment of the belt portion 26 will be below the lower extent of cooking chamber 18 and food products will be introduced onto belt 24 in this region. The food products will thereafter pass into the cooking of cooking chamber 18. In a steam oven, it is desired to create a very high humidity, droplet free saturated steam atmosphere which approaches 100% humidity at a temperature of approximately 212° F., under atmospheric conditions. It has been found to be highly desirable to maintain a very high moisture level in the cooking atmosphere of the oven 10, in order to allow cooking of food products in a shorter amount of time with less weight loss occurring during the cooking process. Within cooking chamber 18, a zone of approximately 100% saturated steam at 212° F. is created at ambient atmospheric pressure or one atmosphere, to obtain high rates of heat transfer to food product as it passes through the cooking chamber 18 to maximize product throughput and yield from the cooking process. A source of steam under pressure generally shown at 32 supplies steam to a steam inlet 34 which will distribute the steam within an upper region of hood member 14. The moisture level within cooking chamber 18 is maintained by injecting steam into the cooking atmosphere in order to substantially fill cooking chamber 18 with 100% saturated steam atmosphere. A feature of the invention is directed to maintaining the highest possible moisture level in the cooking chamber 18 with the minimum amount of steam to make the cooking process cost effective and efficient.

It is therefore an aspect of the invention to prevent the unwanted escape of steam from the oven as well as to prevent the entry of air into the cooking chamber 18. These goals can be achieved by utilizing the natural tendency of steam to separate from air due to its lower density, wherein steam introduced into hood 14 will be maintained in a leak-proof portion of the enclosure 12 corresponding to the region above the inlet and outlet openings 20 and 22 respectively. As shown in FIG. 1, the lower extent of the steam is shown at 36, defining the lower limit of the cooking chamber 18 through which food products are made to pass. The product inlet and outlet openings 20 and 22 are the highest openings in the oven cabinet or enclosure 12, and thus the only place for steam within the cooking chamber 18 to escape from the oven. The lower limit of the cooking chamber is therefore above the openings 20 and 22. To maintain the high moisture level within the cooking chamber 18, introduction of steam from source 32 through steam inlet 34 may be continued after the cooking atmosphere is of approximately 100% saturated steam, to create a very small amount of steam leakage at the highest openings of the enclosure 12. This will ensure that the cooking chamber 18 is substantially filled with steam continuously. An exhaust stack 38 is provided at each of the inlet and outlet openings 20 and 22 for collection of the small amount of escaping steam. Within the exhaust stacks 38, there may be provided a temperature or steam sensing means 39, such as a thermocouple. By providing the sensing means at this location within the stacks, it is possible to use an output signal from the sensor 39 to precisely control the flow rate of steam into the chamber 18 from the steam source 32. The steam flow rate from the openings 20 or 22 can be reduced until only a small amount exits the oven 10, while maintaining the level of steam or steam density constant regardless of product flow into the oven.

Figure 1B:
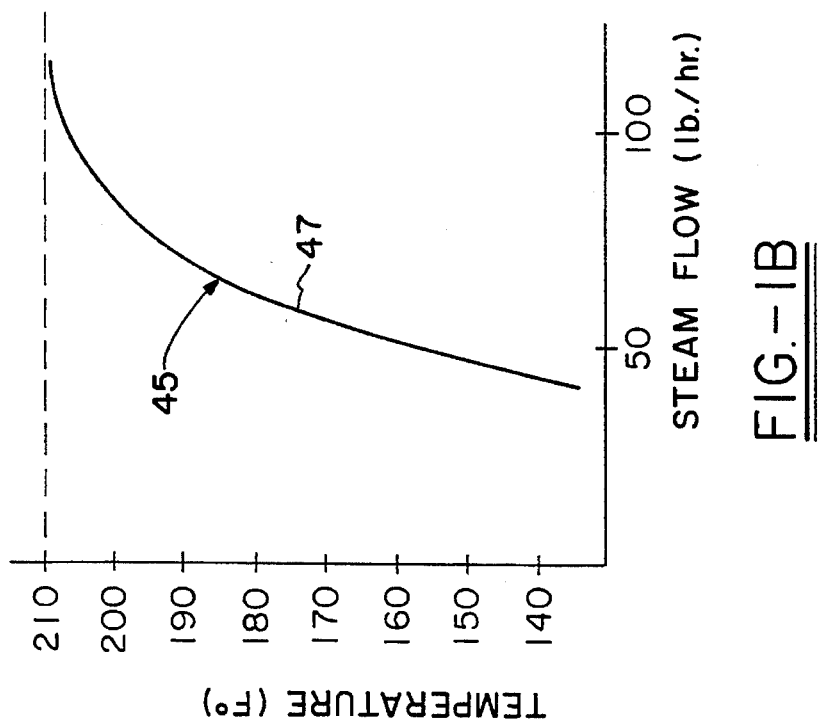
FIG. 1B shows a plot of temperature vs. steam flow in operation of the oven.

In operation, after the cooking atmosphere of approximately 100% saturated steam is created within cooking chamber 18, food products can be loaded onto conveyor belt 24 at the inlet opening 20, from which they will travel upwardly on portion 26 of the belt into the saturated steam cooking atmosphere within cooking chamber 18. Before food products are loaded onto the conveyor 24, the steam flow rate into the oven is automatically controlled to just maintain the level of steam in the chamber. Upon loading of the conveyor with food products, due to the products significantly lower temperature, being ambient temperature for fresh food products and possibly frozen products, the steam within chamber 18 will begin to condense onto the food products, and the amount of steam flowing out of the oven will diminish. This will be monitored by the sensors 39, and the flow of steam into the oven from source 32 will be automatically adjusted to compensate for product flow into the oven to maintain the desired saturated steam atmosphere with the minimum amount of steam. As seen in FIG. 1A, control of the flow rate of steam may be accomplished by means of a controller 41, such as a temperature controller, coupled to the sensing means 39, which may be a thermocouple to monitor the temperature of escaping gases from the oven. The controller 41 may then be coupled to a steam flow control valve 43 to precisely control the flow rate of steam into chamber 18. The arrangement will allow automatic control over steam flow rate to maintain the desired cooking atmosphere and constant steam density regardless of product flow into the oven. In a preferred method of operation, it has been found that the control arrangement of FIG. 1A can automatically control steam flow rate as desired by monitoring the temperature of escaping gases from the inlet and/or outlet openings 20 and 22. In analyzing steam flow rate into the oven, the plot of FIG. 1B shows temperature versus steam flow rate into the oven. It has been found that it is desirable to control the flow rate of steam at a point along the linear portion 47 of the curve 45. As an example, a thermocouple can be positioned relative to the openings 20 and 22 to monitor the temperature of escaping gases, such that a temperature of 150° F. will correspond to the saturated steam atmosphere desired. This temperature falls at approximately the center of the linear portion 47 of the curve 45 as seen in FIG. 1B. Steam flow rate may thereafter be automatically controlled, such as by the arrangement shown in FIG. 1A, to maintain this temperature of escaping gases regardless of product flow into the oven. If product flow into the oven decreases, the flow rate of steam will automatically throttle back, and as product flow increases, the flow rate will correspondingly increase. It should be recognized that other sensor and control arrangements are possible, and are contemplated within the scope of the invention.

Upon introducing food products into the oven, they will be disposed within the saturated steam cooking atmosphere of cooking chamber 18 over a large portion of their path within the oven to maintain high heat transfer and moisture levels of the products during cooking. In this oven, the throughput of food products may be significantly increased as cooking times can be significantly decreased to maximize operation of the oven. After cooking, the food products will travel downwardly out of the 100% saturated steam cooking atmosphere of cooking chamber 18 on portion 30 of belt 24 to the outlet opening 22 of the oven. Food products discharged from the oven at opening 22 are ready for further processing in any desired manner. The conveyor belt 24 is made to continuously travel through the oven by means of an adjustable drive 40, and after discharging food products at outlet opening 22 will be made to pass through a belt wash region 42 and scrubbing brushes 44 for cleaning of the belt.

Figure 2:
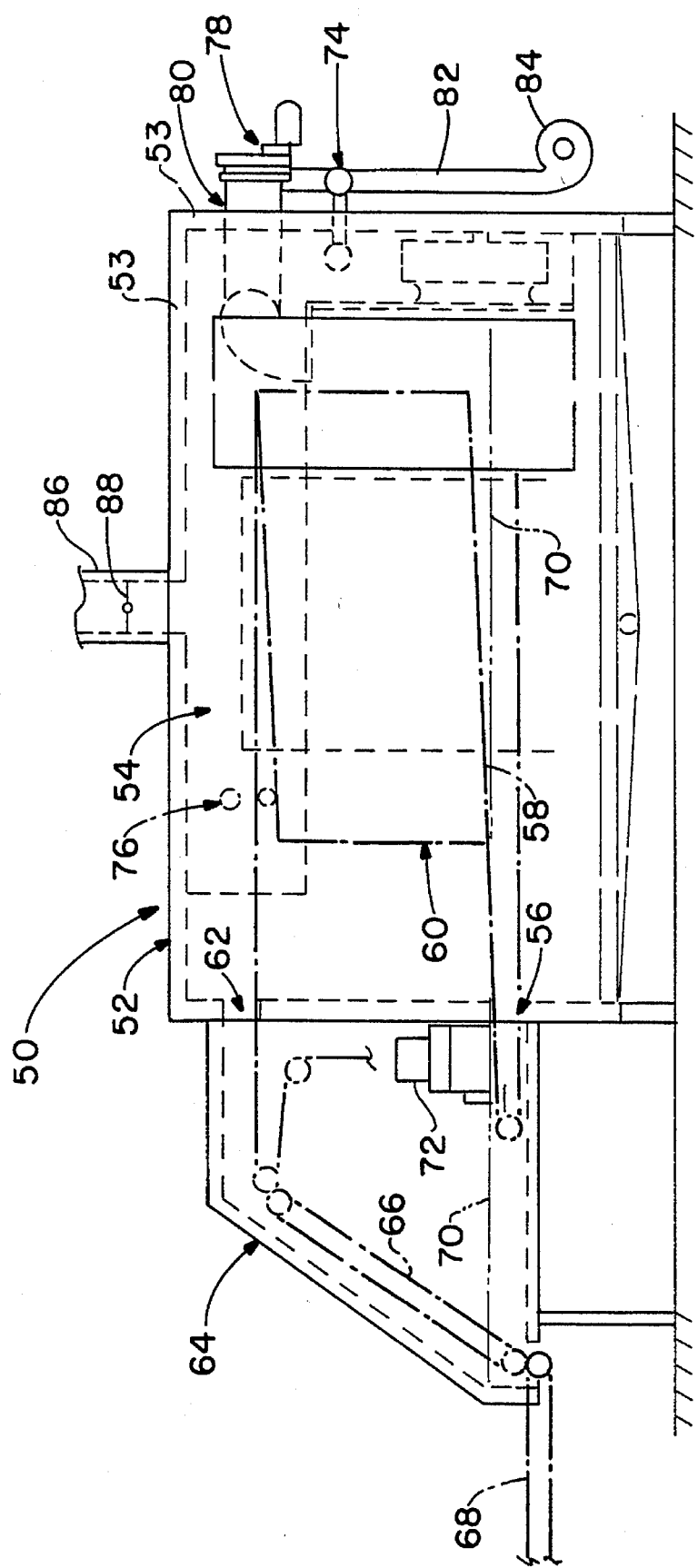
FIG. 2 shows a side elevational view of a cooking oven in accordance with the invention, utilizing a spiral conveyor within the oven.

Turning now to FIG. 2, an alternative embodiment of the invention is shown with regard to a cooking oven having a spiral conveyance path within the cooking chamber thereof. The oven, generally designated at 50 includes a leak-proof housing or cabinet 52 defining a cooking chamber 54 therein. The enclosure 52 includes an inlet opening 56, which is made as small as feasible to retard the egress of a heated cooking atmosphere from cooking chamber 54. The walls of enclosure 52 may be double walls having an interior insulation 53 in the space therebetween to prevent heat loss accordingly. An endless conveyor belt 58 is directed into the oven through the inlet opening 56, and is designed to carry a large volume of food products to be cooked in the oven. The conveyor belt 58 will follow, at least through part of its length, a path comprising a number of superimposed, helically-extending tiers forming a belt pile generally indicated at 60. Details of the conveyor belt and other aspects of the oven 50 may be similar to those described in U.S. Pat. No. 5,078,120, which is hereby incorporated herein by reference. In the configuration of the conveyor belt 58 as shown, food products will be introduced at a relatively low position in cabinet 52, while a discharge or outlet opening 62 is provided at an upper end of cabinet 52 adjacent the upper regions of the conveyor belt stack 60. As outlet opening 62 is provided at an upper region of the cooking chamber 54, the escape of steam from the cooking atmosphere through this opening would be contrary to the goal of maintaining a predetermined amount of steam in the cooking atmosphere within the cooking chamber 54 with the minimal amount of steam.

To overcome this problem, the oven cabinet 54 includes an extension 64 which covers and extends beyond the outlet opening 62 of the oven. The enclosure 64 provides a cabinet for a separate down conveyor belt 66 disposed at the discharge end of conveyor belt 58 adjacent the outlet opening 62 of the oven. The down conveyor 66 allows products cooked in oven 50 to be brought down to a level below the inlet opening 56 for discharge onto an exit conveyor 68 for further processing. The down conveyor housing 64 in association with oven cabinet 52 will prevent escape of steam from the oven and thus maintains a substantially 100% saturated steam atmosphere within the cooking chamber 54 which has a lower extent corresponding to the inlet opening 56 as shown at 70. Again, the natural tendency of steam introduced into the cooking chamber 54 to separate from air due to its lower density will cause any steam introduced into the oven to rise to the top and be trapped within the cooking chamber 54 to maintain the highest possible moisture level with the minimum amount of steam. The down conveyor housing 64 will trap any steam escaping from oven cabinet 52 so as to maintain the substantially saturated steam atmosphere within the region of the down conveyor 66. As seen, the lower extent of the steam at 70, defining the cooking chamber 54 extends into the down conveyor housing 64 at the same level as within oven cabinet 52. As the discharge conveyor 68 is below this level, no steam loss will occur at this location. A source of steam generally indicated at 74 is used to inject steam into cooking chamber 54 down to level 70. As described with reference to the embodiment of FIG. 1, after filling of the cooking chamber 54 with steam, it may be desirable to continuously introduce a small amount of steam into the cooking chamber 54 resulting in a small loss of steam at the inlet opening 56. As the inlet opening 56 is the highest opening in the oven cabinet, the small amount of steam made to escape at this location will ensure that the cooking chamber 54 is full of steam down to level 70. Steam escaping from inlet opening 56 may be collected by an exhaust stack 72, and the steam flow rate into the oven can be automatically controlled by a sensing means and control as previously described. The flow from inlet opening 56 can therefore be controlled to use the minimum amount of steam while maintaining the desired cooking atmosphere.

In operation, food products loaded onto conveyor 58 will initially enter the oven cabinet 52 at a position slightly below cooking chamber 54 defined by the lower extent 70 of steam within the oven. The conveyor belt 58 is then made to travel upwardly in a spiral path within the steam atmosphere of cooking chamber 54. The belt 58 has a substantial portion of its length within the cooking chamber 54, including when traveling on down conveyor 66 within the down conveyor enclosure 64. A minimum amount of steam can be used to fill the cooking chamber 54 while maintaining the highest possible moisture level therein. The escape of steam from the cooking chamber 54 is substantially eliminated, and the time for cooking of a particular food product may be reduced with less weight loss of the food product.

Further, in each embodiment of the invention, a variety of sensors 76 may be positioned within cooking chamber 54 to monitor the cooking atmosphere therein. Such sensors may monitor the humidity, temperature or other variables of the cooking atmosphere, and additional sensors may be provided to monitor the injection and/or escape of steam from the cooking chamber 54. It is also contemplated in this embodiment, to bring the food product conveyor 58 down within the oven cabinet 52 to a point below the inlet opening 56 and the lower extent 70 of the cooking chamber. The food products would then exit the oven at a lower level to prevent the escape of steam from the outlet opening. With various food products, it would be possible to use an elevator conveyor to lower the product inside the oven cabinet 52 accordingly. Alternatively, a different configuration of a down conveyor 66 may be utilized if desired. Also shown within FIG. 2 is an optional heating arrangement, which may be used in each embodiment of the invention in combination or separately from the source of steam 74. As it is many times desirable to have an oven including the combination of steam and gas firing to create a desirable cooking atmosphere, a gas burner 78 may be provided with the oven 50. Normally the gas burner 78 will require a throughhole 80 in an upper portion of the oven cabinet 52. The hole 80 may also provide a location for steam to escape from the cooking chamber 54 when oven 50 is operated as steamer with the burner 78 off. Further, the use of steam exclusively of the burner 78 has been found to cause significant deterioration of the gas burner 78 and an associated blower 84 used to circulate heated air into the cooking chamber 54. For this invention, the gas burner is modified to eliminate any escape of steam from the cooking chamber 54, and to protect the burner equipment from damage. In this embodiment, the burner 78 is supplied with combustion air by means of a duct 82 coupled to a remote combustion blower 84. The blower 84 is positioned remote from the oven and is mounted below the steam level 70 within cooking chamber 54. The positioning of the blower 84 at this location provides for steam level equalization. The level 70 of steam within the cooking chamber 54 will equalize into the duct 82 at a point above any opening through which the steam could escape, thereby preventing escape of steam above the chamber product outlet. The combustion blower 84 is also provided with a weep hole at the lowest point thereof, to allow condensate developed therein during steam operation to drip out of the blower so as to protect the unit from damage. Also in this embodiment, as the oven is to be used in a gas-fired or combination mode, an exhaust duct 86 is required to purge the gas-fired oven, and the exhaust duct 86 is therefore equipped with a damper 88 which is configured to be steam-tight to prevent steam loss up this stack when the oven 50 is used as a steamer. In this way, the oven is very versatile and can be used as gas-fired oven with or without introduction of steam, and as a steam-only oven when desired.

Turning now to FIG. 3, an alternate embodiment of an oven in accordance with the invention will be described. In this Figure, only a portion of the oven housing 102 is shown. In this embodiment, a steam recovery unit 112 maintains a predetermined amount of steam within the oven by preventing the escape of steam therefrom. It is to be understood that the aspects of this embodiment may be utilized at any opening site associated with the oven housing 102, from which steam within a cooking chamber 104 could escape. In this embodiment, an inlet or outlet opening 106 is provided at a location above the lower extent of a cooking chamber 104 shown at 108, coinciding with the lower extent of steam within the cooking chamber 104. As described with reference to previous embodiments, the level 108 may coincide another opening in the oven cabinet 102 corresponding to inlet or outlet opening or the like. For example, opening 106 may correspond to the outlet opening of the oven generally shown in FIG. 2, which is located at an upper portion of the oven cabinet, and would normally allow significant losses of steam therefrom. As an alternative to the down conveyor shown in FIG. 2, or with any opening in the oven cabinet 102 situated above the lower extent of the cooking chamber 104 a steam recovery unit generally indicated at 112 can be used to prevent escape of steam from the cooking chamber 104 as desired. The steam recovery unit 112 may comprise a steam recovery hood 114 situated adjacent the opening 106, into which any escaping steam will flow from opening 106. Due to the tendency of the steam to separate from air because of its lower density, any escaping steam will rise to the top of hood 114 for recovery. The steam recovery unit 112 also includes a duct 116 associated with the steam recovery hood 114, and positioned at the apex of hood 114 to ensure that escaping steam is channeled therein. The duct 116 is configured to extend downwardly from the steam recovery hood 114 to a position at the lower extent of cooking chamber 104 where it is coupled through oven cabinet 102 to reintroduce recovered steam back into the cooking chamber 104. Within the steam recovery duct 116 is provided a damper 118 and circulation fan 120 which are used to control flow through the steam recovery duct 116. In the preferred embodiment, the steam recovery unit will be operated in a manner such that the flow rate of steam captured by the unit and returned to the cooking chamber 104 will be carefully adjusted to prevent the introduction of air into the steam recovery unit 112, which would thereafter be introduced into the cooking chamber 104. It is therefore desired to allow a small amount of steam to escape from the steam recovery unit 112, to an exhaust stack 122 situated downstream of the steam recovery hood 114, with steam flow rate control effected in a manner similar to that previously described. By allowing a small amount of steam to escape to the exhaust stack 122, it is ensured that the steam recovery hood is thoroughly saturated with escaping steam, and no air can be introduced into the system through the steam recovery unit 112. The flow rate of steam through the steam recovery unit 112 is controlled by means of the damper 118 and fan 120 to allow the above preferred operation of the steam recovery unit 112.

Figure 4:
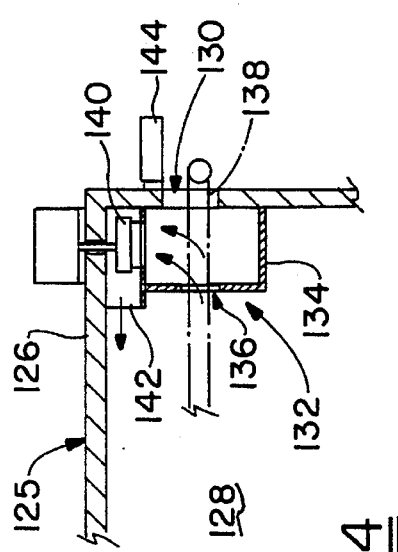
FIG. 4 shows a partial side elevational view of an oven housing and an inlet or outlet associated therewith with steam containment means provided therewith.

A further embodiment of the invention is shown in FIG. 4, wherein again, only a partial portion of an oven generally designated 125 is shown. The oven 125 includes an oven housing or cabinet 126 of a configuration similar to the embodiments of FIGS. 1 or 2. Again, the oven cabinet 126 will define a cooking chamber generally designated 128 therein with the lower extent of the cooking chamber 128 defined by the lower level of steam therein. In this embodiment, an opening 130 may correspond to an inlet or outlet opening of the oven, which is positioned above the lower extent of the cooking chamber 128. In such a configuration, escape of steam from the cooking chamber 128 through opening 130 is substantially prevented by means of a steam containment apparatus generally designated at 132. The steam containment unit 132 comprises an enclosure 134 on the interior of oven 125 within the cooking chamber 128. The enclosure 134 has an opening 136 through which a conveyor belt 138 travels toward the opening 130 of the oven cabinet 126. Around this opening 136, steam will enter the enclosure 134 and due to its lower density will rise to the upper regions thereof. Within the enclosure 134 is provided circulation fan 140 having its suction side exposed to the interior of enclosure 134 to draw steam entering the enclosure 134 therein. The circulation fan 140 has a discharge side associated with an exit opening 142 from enclosure 134, such that steam entering enclosure 134 will be drawn into the circulation fan 140 and forced back into cooking chamber 128 to prevent its escape. In a similar manner to previous embodiments, the operation of the steam containment unit 132 may specifically allow a small amount of steam to escape from the opening 130 into an exhaust stack 144 disposed outside of the oven adjacent to the opening 130. The small amount of steam escaping opening 130 will ensure that no air is introduced into cooking chamber 128, and will allow control of steam flow rate into the oven to ensure that the desired cooking atmosphere is maintained within cooking chamber 128 with a minimum of steam input.

Figure 5:
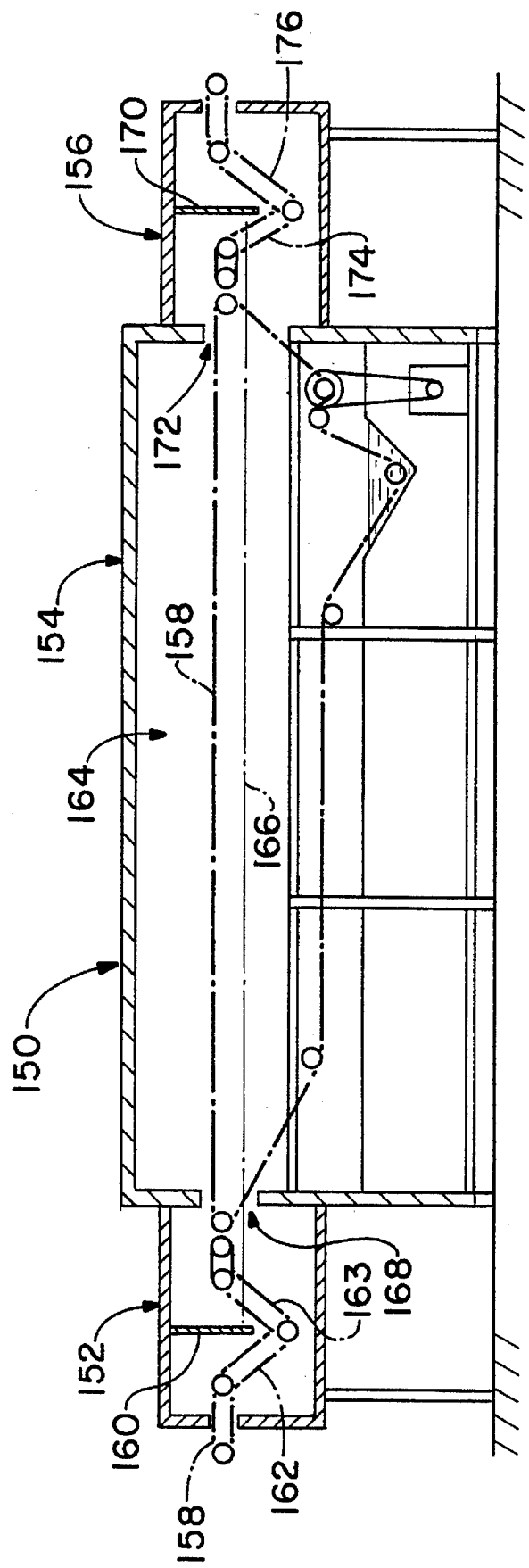
FIG. 5 shows an alternative embodiment of an oven in accordance with the invention.

Turning now to FIG. 5, a generally schematic representation of an alternate embodiment in accordance with the invention is shown. In this embodiment the oven generally indicated at 150 is shown to include sections comprising a tempering chamber 152, a main oven 154, and an equilibration chamber 156 associated therewith. The tempering chamber 152 is provided at an input end of the oven 150, with a conveyor belt 158 positioned to accept quantities of a food product to be cooked thereon and subsequently passing into the tempering chamber 152 to slightly raise the temperature of the food products on the food belt before introduction into the main portion of oven 150. In this embodiment, tempering chamber 152 is provided with a baffle 160 extending from a top wall of tempering chamber 152 to essentially form a separate chamber in association with main oven compartment 154, having an open-bottom end. The conveyor belt 158 includes means to direct the conveyor downwardly over a portion 162 before baffle 160 in the tempering chamber 152 and thereafter upwardly over portion 163 into the cooking chamber of the oven 150 generally designated at 164. As in previous embodiments, the cooking chamber 164 is defined by the enclosure of the oven and has a lower extent coinciding with the lower extent of steam within the oven. In this embodiment, the cooking chamber 164 extends into the tempering chamber 152 and equilibration chamber 156 as shown by line 166. The baffle 160 associated with the tempering chamber 152 extends to a point below an inlet opening 168 associated with the main oven compartment 154, such that steam escaping through inlet opening 168 will be trapped by baffle 160 as indicated.

Similarly, the equilibration chamber 156 includes a baffle 170 also extending below the level of an outlet opening 172 associated with the main oven compartment 154. Steam escaping from outlet opening 172 will likewise be trapped to create cooking chamber 164 extending into equilibration chamber 156. The conveyor belt 158 includes a downward conveyance path at 174 at the location of baffle 170, and upper path 176 is provided to allow food products on conveyor belt 158 to exit oven 150 at the same height. As the main oven compartment 154 is formed with inlet and outlet opening 168 and 172 respectively, it does form a higher temperature region through which food products introduced on conveyor belt 158 will pass within cooking chamber 164. The equilibration chamber 156 provides a lower temperature area in which food products can begin cooling before exiting the oven 150. In accordance with this embodiment, it is also contemplated that the tempering chamber and equilibration chamber associated with a main oven compartment may have an opening associated therewith which are positioned below the level of steam 166 defining the cooking chamber of the oven. A portion of the conveyor belt 158 may then be directed upwardly into the cooking chamber defined within each of the sections of the oven at an inlet, and downwardly out of the cooking chamber at a discharge end thereof. This configuration would have similarities to the embodiment described with respect to FIG. 1, including the tempering and equilibration chambers associated therewith.

The oven of the invention allows a cooking atmosphere to be obtained, which is approximately 100% saturated steam at a temperature of 212° F. and pressure of one atmosphere, to enable mass quantities of food products to be quickly and efficiently cooked in a steam atmosphere. The steam atmosphere is maintained at the highest possible moisture content with the minimum amount of steam input into the system. Escape of steam from the oven is substantially prevented, but allowing very small amounts of steam to escape enables precise control of steam flow rate for desired operation of the oven. Although the oven has been defined in terms of simplified illustrated examples and preferred particular embodiments, it is contemplated that various alterations and modifications may be made without departing from the scope of the invention as defined in the appended claims.

What is claimed:

1. An oven for cooking food products, comprising, an oven housing defining a cooking chamber in an upper portion thereof and having at least one inlet opening and at least one outlet opening positioned in a predetermined relationship to said cooking chamber, a continuous conveyer belt on which food products to be cooked are positioned, said conveyer belt traveling through said oven housing from said at least one inlet opening to said at least one outlet opening and defining a conveyance path through said cooking chamber, wherein said conveyer belt includes a first portion extending upwardly from said at least one inlet opening into said cooking chamber and a second portion extending downwardly from within said cooking chamber to said at least one outlet opening, means to provide a heated gaseous cooking medium in said upper portion of said housing corresponding to said cooking chamber, including a source of steam, wherein said cooking chamber has a lower limit defined by the lower extent of the level of 100% saturated steam within said housing, and said at least one inlet and outlet openings are positioned below said lower limit of said cooking chamber, control means to regulate the amount of steam introduced into said cooking chamber including a sensing means positioned adjacent to at least one of said inlet and outlet openings to monitor the amount of steam escaping through said at least one of said inlet and outlet openings and generating a signal used to control the flow rate of steam from said source of steam into said housing wherein, said control means regulates the flow of steam into said housing in a manner such that a small amount of saturated steam is made to continuously escape through at least one of said inlet and outlet openings so as to maintain said lower limit of said cooking chamber, as defined by the lower extent of said level of 100% saturated steam, at a level substantially equal to the level at which steam continuously escapes said at least one of said inlet and outlet openings.

2. The oven according to claim 1, wherein, said conveyor belt extends linearly within said housing between said at least one inlet to said at least one outlet.

3. The oven according to claim 1, further comprising a temperature controller and a steam flow control valve wherein, said sensing means is a temperature sensor used to monitor the temperature of saturated steam escaping through at least one of said inlet and outlet openings, said temperature sensor generating said signal which is supplied to said temperature controller which in turn controls said steam flow control valve to regulate the flow of steam into said housing in a predetermined manner.

4. The oven according to claim 3, further comprising an exhaust stack located adjacent said at least one inlet opening and an exhaust stack located adjacent said at least one outlet opening to respectively capture saturated steam escaping through said inlet and outlet openings, wherein each exhaust stack comprises said temperature sensor therein.

5. The oven according to claim 1, wherein, said oven housing includes a hood portion and base portion, wherein said hood portion is separable from said base portion, and including means to lift said hood portion away from said base portion, wherein said hood includes means to seal said hood with respect to said base to prevent loss of heat from said oven.

6. The oven according to claim 1, wherein, the cooking atmosphere within said cooking chamber comprises droplet free saturated steam at substantially 100 percent humidity and a temperature of substantially 212° F.

* * * * *